UNITED STATES PATENT OFFICE.

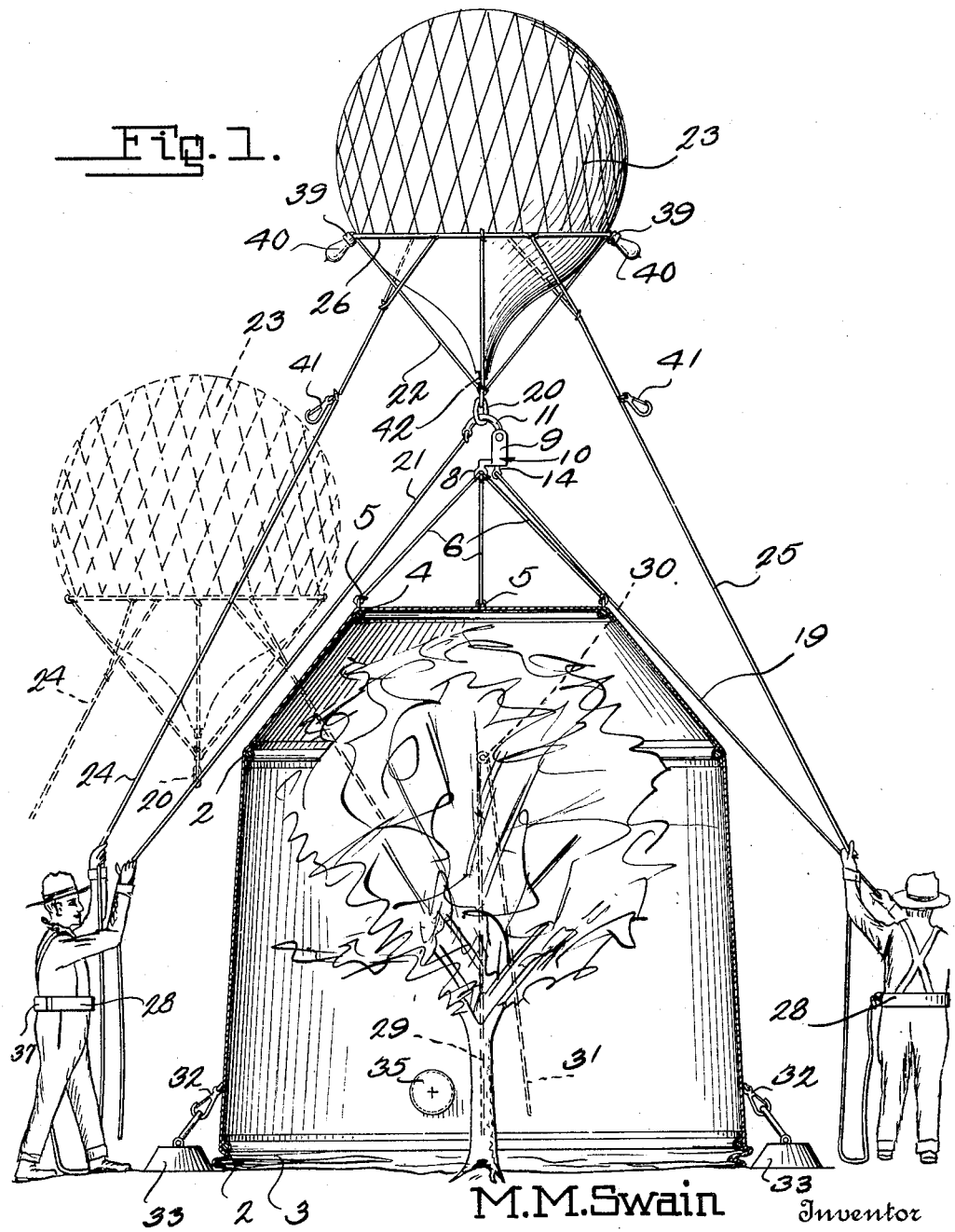

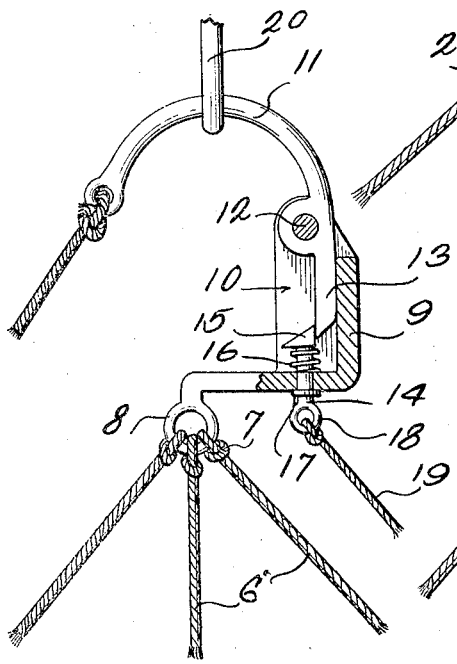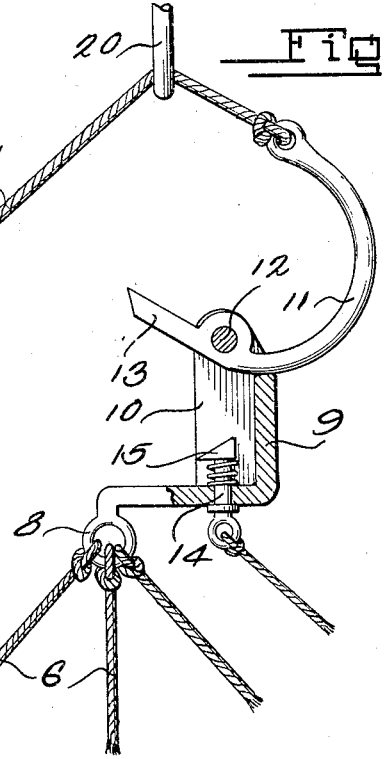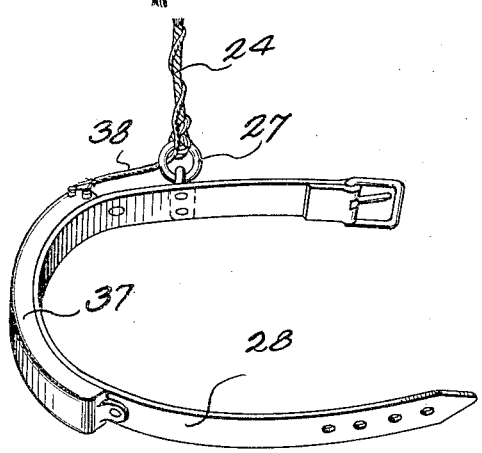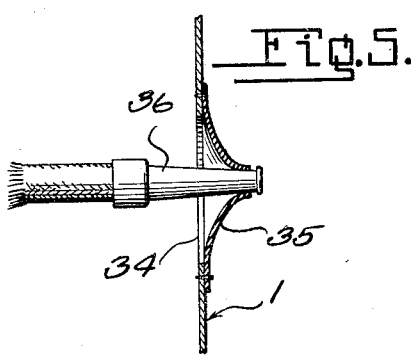

MACK M. SWAIN, OF LOS ANGELES, CALIFORNIA, ASSIGNOR OF FORTY ONE-HUNDREDTHS TO CHESTER C. CONKLIN.

FUMIGATING-TENT.

1,322,149.     Specification of Letters Patent.     Patented Nov. 18, 1919.

Application filed November 1, 1918. Serial No. 260,673.

*To all whom it may concern:*

Be it known that I, MACK M. SWAIN, a citizen of the United States, and a resident of Los Angeles, in the county of Los Angeles and State of California, have invented certain new and useful Improvements in Fumigating-Tents, of which the following is a specification.

This invention relates to a tent or canopy structure for use during the fumigating of trees, and an object of the invention is to provide a device of this nature which may be conveniently moved from one tree to another.

In certain sections of the country, particularly where citrus is grown, liquid hydrocyanic acid gas is used for fumigating the trees to destroy insect lives thereon. This gas which decomposes readily under certain conditions of light to form the gas, is usually applied to the trees, by injecting it within a canopy or tent closure which incloses the tree being fumigated, thus subjecting the tree to the action of the gas for destroying various pests such as black scale, mealy bugs, Citricolo scale, Aphis, and other pests which tend to destroy trees and the fruits thereof. In the present method cumbersome constructions of canopies are employed which must be taken down and set up about each tree requiring a number of men to properly perform the fumigating operation of the tree and requiring considerable time, especially in cases of large orchards being fumigated; and it is an object of this invention to provide means whereby the canopy or tent may be easily, conveniently and quickly moved from one tree to another, requiring the services of a minimum number of men, and utilizing a buoyant object, such as a balloon, for hoisting and carrying the tent or canopy from one tree to another.

In fumigating large orchards, a number of the tents are employed, particularly in view of the fact that each tent must remain about the tree after the forcing of the fumigating gas into the tent, for practically one hour and it is an object of this invention to provide means whereby the carrying balloon may be easily connected to or disconnected from a tent, allowing the balloon to be utilized for positioning one tent, disconnected therefrom and connected to a second tent for carrying it from one tree and positioning it about another.

The invention further comprehends the provision of a plurality of guiding ropes which are connected to the balloon and have their lower end connected to belts to be worn by the "guide men" by means of which guide ropes the balloon is properly guided or conveyed as desired, and which guide ropes also facilitate in the drawing of the balloon downwardly within reach of one of the guide men, to permit its connection with the connected guide rope of the structure.

Other objects of the invention will appear in the following detailed description, taken in connection with the accompanying drawings, forming a part of this specification, and in which drawings:

Figure 1 is a sectional view through a tent or canopy constructed in accordance with this invention and having the conveying or carrying balloon connected thereto.

Fig. 2 is a side elevation showing parts in fragments of the releasable hook mechanism for connecting the balloon to the tent or canopy, showing the hook in a locked position.

Fig. 3 is a view similar to Fig. 2 showing the hook in an open position to permit disconnection between the balloon and the tent.

Fig. 4 is a detail perspective view of the belt worn by one of the "guide men," and Fig. 5 is a fragmentary section through the tent or canopy showing the closure or the opening which permits the insertion of the nozzle of the fumigating machine thereinto.

Referring more particularly to the drawings, 1 indicates the tent or canopy proper which is constructed of suitable fabric, such as heavy ducking or canvas, the said tent being reinforced, by a plurality of vertically spaced bracing rings 2. The rings 2 may be connected to the fabric of the tent in any suitable manner and the lowermost ring is positioned upwardly of the lower end of the canvas or fabric of which the tent is formed, allowing a relatively loose lower edge portion 3 of the tent which may be folded, as shown in Fig. 1, and allow for undulations in the surface of the ground so as to form a tight closure about the lower end of the tent or canopy. The top of the tent or canopy 1 is braced by a bracing ring 4 which has a plurality of eyes 5 connected thereto. These eyes 5 have ropes or cables 6 connected thereto, the upper ends of which are connected as shown at 7 to the depending rings 8 formed upon the main body 9 of the connecting hook structure generically indicated by the numeral 10. The hook 10 is positioned directly above the vertical axis of the tent or canopy 1 and the body 9 has a substantially U-shaped hook 11 pivotally connected thereto as shown at 12. The end 13 of this hook 11, which normally depends from the pivot 12 forms a locking bolt for coaction with the spring controlled latch bolt 14. The latch bolt 14 has a head 15 mounted upon its upper end, the upper surface of which is beveled so as to facilitate the passage or travel of the lower beveled end of the depending portion 13 thereover, the spring 16 which normally holds the head 15 upwardly, allowing the pin 14 to be depressed sufficiently to permit the locking end or lug 13 to move back of the head 15 as shown in Fig. 1 of the drawings, to lock the hook member 11 in a rigid position. A collar 17 is carried by the latch bolt 15 for limiting the upward movement of the bolt and this bolt has an eye 18 upon its lower end to which a trip rope 19 is connected. This trip rope 19 is provided for forcing the latch bolt 14 downwardly to permit disconnection between the head 15 and the lug 14 to allow the hook 11 to swing into an upward position as shown in Fig. 3 of the drawings, presenting its open side at an upward incline or angle so as to allow the ring 20 to pass off the hook 11 onto the guiding rope 21. The ring 20 is carried by suitable depending cables 22 which are in turn connected to the balloon bag 23, for connecting the balloon structure to the tent or canopy structure as shown in Fig. 1 of the drawings, so as to allow of lifting the tent or canopy by the buoyancy or ascensional effort of the balloon. In connecting the balloon 23 to the tent or canopy 1, the balloon is drawn downwardly toward the ground by the "guide men" shown in Fig. 1 of the drawings, so that the lower end of the guide rope 21 may be inserted through the ring 20 and the balloon will then slowly ride along the rope 21, and be engaged over the hook 11, connecting the balloon to the tent or canopy. The balloon 23 is drawn downwardly by the guide ropes 24 and 25 which are connected to the lower annular ring or bend 26 of the netting which is mounted over the gas bag of the balloon and they extend downwardly, having their lower ends connected in any suitable manner to rings 27 which are attached to belts 28. The belts 28 are to be worn by the "guidemen" so that they can, by walking to any desired place, guide the balloon thereto, eliminating the necessity of the use of their hands in guiding the balloon or moving the balloon from one place to the other. When it is desired to release the balloon from a canopy 1 which has been properly positioned about a tree the trip rope 19 is pulled downwardly which will move the latch bolt 14 downwardly allowing the ascensional effort of the balloon to swing the hook 11 upon its pivot, to permit the ring to pass off the hook onto the guide rope 21, thereby breaking the direct connection between the balloon and the canopy. The guide men then release their hold upon the rope 21 and walk away to the next tent to be moved, the ring 20 passing along the rope 21 without affecting the position of the tent or canopy, until the ring has passed off the free end of the rope 21.

The tent or canopy 1 is provided with a collapsing rope 29 indicated in dotted lines in Fig. 1, the lower end of which is connected to the lowermost guide or bracing ring 2 and it extends upwardly therefrom over a suitable pulley 30 carried by the uppermost ring 2 and downwardly having its free end 31 positioned exteriorly of the canopy and to be conveniently grasped by a person for collapsing the tent or moving the lower portion thereof upwardly to facilitate the movement of the tent or canopy from about one tree to another, decreasing the height of the tent or canopy and thereby decreasing the distance which the canopy or tent must be raised to free it from the tree about which it has been positioned. The tent or canopy 1 has snap hooks 32 attached thereto near its lower edge which are adapted for detachable connection with weights 33 provided to hold the lower portion of the tent or canopy down and prevent it from being raised during the charging of the interior of the tent or canopy with the fumigating gases. The tent or canopy 1 is provided with an opening 34 extending therethrough near its lower portion, about which opening is positioned a resilient or rubber closure member 35. This closure member is formed in the usual manner of closures of this type, being substantially conical in shape and having an opening in the center thereof which is closed by the contracting action of the material of which the closure is formed, so as to form substantially an air tight closure which may be opened by the forcing of the nozzle 36 of the fumigating machine therethrough as shown in Fig. 5 of the drawings, to allow the portion of the fumigating liquid gas into the tent.

Each of the belts 28 carries an electric battery 37 which is connected by suitable constructing wires indicated at 38 to lamp sockets 39 carried by the ring 26 of the balloon structure. These lamp sockets 39 receive the usual type of incandescent lamp bulbs 40 so that these lights may be lighted, to illuminate the balloon, canopy and space thereabout, when the fumigating is done at night which is generally the case.

The conducting wires 38 may be twisted about or in the guide ropes 24 if desired, and these guide ropes have snap hooks 41 carried thereby short distances below the netting of the balloon structure, which snap hooks are provided for connection with the weights 33 to hold the gas bags of the balloon while it is being inflated and the balloon gas bag is inflated through an ordinary inflating valve indicated at 42.

It will be noted by particular reference to Fig. 2 of the drawings, that the back portion of the body 9 of the hook structure, forms means for limiting the rearward or downward movement of the hook 11.

Changes in details may be made without departing from the spirit of this invention, but;

I claim:

1. In a fumigating device, the combination, of a tree inclosing canopy and a balloon connected thereto.

2. In a fumigating device, the combination, of a tree inclosing canopy, a balloon, and means for detachably connecting said balloon to said canopy.

3. In a fumigating device, the combination, of a tree inclosing canopy, a balloon, means positioned above the canopy and in alinement with the central axis thereof for detachably connecting the balloon to the canopy.

4. In a fumigating device, the combination, of a tree inclosing canopy, a balloon, means positioned above the canopy and in alinement with the central axis thereof for detachably connecting the balloon to the canopy, and latch means for preventing accidental disconnection of the balloon and canopy.

5. In a fumigating device, the combination, of a tree inclosing canopy, a balloon, means positioned above the canopy and in alinement with the central axis thereof for detachably connecting the balloon to the canopy, latch means for preventing accidental disconnection of the balloon and canopy, and a trip rope for releasing said latch means.

6. In a fumigating device, the combination, of a tree inclosing canopy, a balloon, means positioned above the canopy and in alinement with the central axis thereof for detachably connecting the balloon to the canopy, and means connected to said connecting means for guiding the balloon for proper connection therewith.

7. In a fumigating device, the combination, of a tree inclosing canopy, a balloon, means positioned above the canopy for detachably connecting the balloon to the canopy, latch means for preventing accidental disconnection of the balloon and canopy, a trip rope for releasing said latch means to permit disconnection of the balloon and canopy and means connected to said connecting means for guiding said balloon for proper connection therewith.

8. In a fumigating device, the combination, of a canopy, a balloon connected to the top of said canopy, guiding ropes connecting to said balloon and extending downwardly along the outer surface of the canopy.

9. In a fumigating device, the combination, of a tree inclosing canopy, a balloon, means for detachably connecting the balloon to said canopy, guide ropes connected to said balloon, and means carried by said ropes for connecting their lower free ends to the body of a person.

10. In a fumigating device, the combination, of a tree inclosing canopy, a balloon, means positioned above the canopy and in alinement with the central axis thereof for detachably connecting the balloon to the canopy, latch means for preventing accidental disconnection of the balloon and canopy, a trip rope for operating said latch means, guide ropes connecting to said balloon and extending downwardly exteriorly of the canopy, and body engaging belts connected to the lower free ends of said guide ropes.

11. In a fumigating device, the combination, of a tree inclosing canopy, a balloon, means positioned above the canopy and in alinement with the central axis thereof for detachably connecting the balloon to the canopy, latch means for preventing accidental disconnection of the balloon and canopy, a trip rope for operating said latch means, guide ropes connected to said balloon and extending downwardly exteriorly of the canopy, and body engaging belts connected to the lower free ends of said guide ropes, lighting means carried by said balloon, and means carried by said body engaging belt and operatively connecting with said lighting means for energizing the lighting means.

12. In a fumigating device, the combination, of a tree inclosing canopy, a pivotally supported hook connected to said canopy, a guide rope connected to one end of said hook, a balloon, a ring carried by said balloon and adapted to engage said guide rope therethrough whereby the ascensional effort of the balloon will carry it upwardly along said guide rope for connection between said ring and hook.

13. In a fumigating device, the combination, of a tree inclosing canopy, a pivotally supported hook connected to said canopy directly above the central axis thereof, a guide rope connected to one end of said hook, a balloon, a ring carried by said balloon and adapted to engage said guide rope therethrough whereby the ascensional effort of the balloon will carry it upwardly along said guide rope for connection of the ring and hook, and releasable locking means for holding said hook in a ring receiving position to maintain the connection between the balloon and canopy.

14. In a fumigating device, the combination, of a tree inclosing canopy, a pivotally supported hook connected to said canopy directly above the central axis thereof, a guide rope connected to one end of said hook, a balloon, a ring carried by said balloon and adapted to engage said guide rope therethrough whereby the ascensional effort of the balloon will carry it upwardly along said guide rope for connection of the ring and hook, and releasable locking means for holding said hook in a ring receiving position to maintain the connection between the balloon and canopy, a trip rope connected to said releasable locking means to release the same to allow said hook to swing into a balloon releasing position.

15. In a fumigating device, the combination, of a tree inclosing canopy, a pivotally supported hook connected to said canopy directly above the central axis thereof, a guide rope connected to one end of said hook, a balloon, a ring carried by said balloon and adapted to engage said guide rope therethrough whereby the ascensional effort of the balloon will carry it upwardly along said guide rope for connection of the ring and hook, and releasable locking means for holding said hook in a ring receiving position to maintain the connection between the balloon and canopy, a trip rope connected to said releasable locking means to release the same to allow said hook to swing into a balloon releasing position, guide ropes connected to said balloon for guiding the movement of the balloon.

16. In a fumigating device, the combination, of a tree inclosing canopy, a pivotally supported hook connected to said canopy directly above the central axis thereof, a guide rope connected to one end of said hook, a balloon, a ring carried by said balloon and adapted to engage said guide rope therethrough whereby the ascensional effort of the balloon will carry it upwardly along said guide rope for connection of the ring and hook, and releasable locking means for holding the said hook in a ring receiving position to maintain the connection between the balloon and canopy, a trip rope connected to said releasable locking means to release the same to allow said hook to swing into a balloon releasing position, guide ropes connected to said balloon for guiding the movement of the balloon, lighting means carried by said balloon, and energizing means for said lighting means connected to the lower end of said balloon guiding ropes.

MACK M. SWAIN.